US006755297B2

(12) United States Patent
Conry

(10) Patent No.: US 6,755,297 B2
(45) Date of Patent: Jun. 29, 2004

(54) SYMBOL PRINTER

(75) Inventor: Patrick M Conry, Hot Springs, AR (US)

(73) Assignee: Hi-Tech Engineering, Inc., Hot Springs, AR (US)

( * ) Notice: Subject to any disclaimer, the term of this patent is extended or adjusted under 35 U.S.C. 154(b) by 110 days.

(21) Appl. No.: 10/186,747

(22) Filed: Jul. 2, 2002

(65) Prior Publication Data

US 2003/0009258 A1 Jan. 9, 2003

Related U.S. Application Data

(60) Provisional application No. 60/302,387, filed on Jul. 3, 2001.

(51) Int. Cl.[7] ............................ B27H 1/00; B65G 47/26

(52) U.S. Cl. ............................ 198/339.1; 198/457.03; 198/461.1; 101/93.01; 144/358

(58) Field of Search ......................... 198/461.1, 457.03, 198/462.1, 456, 339.1; 101/93.01, 474, 484; 144/358

(56) References Cited

U.S. PATENT DOCUMENTS 2,918,951 A * 12/1959 Haumann ................... 144/421
3,115,236 A * 12/1963 Anetsberger ................ 198/458
3,168,863 A * 2/1965 McRae ......................... 101/43
3,983,403 A * 9/1976 Dahlstrom et al. .... 250/559.25
4,169,173 A * 9/1979 Bergholm et al. .......... 427/284
4,195,346 A * 3/1980 Schroder ..................... 700/167
4,207,472 A * 6/1980 Idelsohn et al. ....... 250/559.46
4,325,477 A * 4/1982 Heikinheimo ............ 198/461.1
4,392,204 A * 7/1983 Prim et al. .................. 700/227
4,852,029 A * 7/1989 Pope et al. .................... 702/41
5,097,881 A * 3/1992 Mack .......................... 144/356
5,544,757 A * 8/1996 Geiger et al. ............... 209/518
5,775,397 A * 7/1998 Lippincott .................. 144/356
5,797,478 A * 8/1998 Gambetti ..................... 198/441
5,890,579 A * 4/1999 Young ...................... 198/459.6
5,950,800 A * 9/1999 Terrell et al. ............... 198/448
6,529,799 B1 * 3/2003 Paulk et al. ................ 700/227

* cited by examiner

*Primary Examiner*—Douglas Hess
(74) *Attorney, Agent, or Firm*—W. Warren Taltavull; Manelli Denison & Selter PLLC

(57) ABSTRACT

A lumber processor includes slowdown conveyor to transition lumber pieces from one processing device to a subsequent processing device where the movement of lumber pieces changes from lineal to lateral motion; a printer station includes a printer boom which includes a lateral translation device to move a symbol printer over the path of travel of the conveyor to allow the printer to mark pieces of lumber that are passing beneath the printer station.

8 Claims, 2 Drawing Sheets

SYMBOL PRINTER

This application claims the benefit of prov. appl. 60/302,387 filed Jul. 3, 2001.

FIELD OF THE INVENTION

The present invention relates to cut lumber processing and handling devices that will allow greater manufacturing efficiency and lower costs while increasing quality of the resulting products. More specifically, the present invention relates to a scanner which will operate in cooperation with a printer which will print results derived from the scanning operation on each lumber place for subsequent sorting and handling in a lumber mill.

BACKGROUND OF THE INVENTION

In present-day in lumber mills, the practice has become common of increasing throughput speeds in order to reduce costs and to take advantage of increased processing speeds made possible by the use of operational sensors and computers. However, when new equipment is installed in a production line, it is desirable that the production speed of the original equipment not be compromised. It sometimes happens in established mills that new equipment can be operated efficiently at higher speeds than the already installed equipment so that some type of accommodation is required to minimize any reduction in the through put speed and capacity of the mill operation.

A difficulty in enhancing mill production capacity is the wide variety as well as the number of defects in the lumber that are encountered. Some of these defects cannot be accurately detected by automatic sensors particularly those operating at the increased conveying speeds presently in use. As a consequence, human inspection is still required for some grades of lumber. Such human inspections can take place where the lumber path is required to turn through as much as 90° such as when the lumber is passed from a planing device to a sorting device in a mill operation. With the increasing scarcity of good grade of lumber, the types and variety of the defects in the lumber are likely to increase so that the necessity of effective scanning, electronically and by visual inspection, before sorting is correspondingly increased to assure that the final product is marketable.

SUMMARY OF THE INVENTION

The present invention provides an arrangement for a lumber mill and a method of operation that will enable a mill operator to maintain the production capacity while taking advantage of increased grading accuracy speeds afforded by presently available defect scanning devices. In addition, a mounting arrangement for a symbol printer is provided to improve the flexibility of the printing operation relative to conveying apparatus conventionally used in lumber mills.

More specifically, in presently operating mills and in other environments, it has been the practice to employ slowdown conveyors to transition lumber pieces from one processing device to a subsequent processing device and were the movement of the lumber piece changes from lineal to lateral motion. In cooperation with at least one of the slowdown conveyors where a sequential series are employed, at a printing station, a printing boom is installed which includes a lateral translation device to move a symbol printer over the path of travel of the conveyor to allow the printer to mark pieces of lumber that are passing beneath the printer station. The printer output is preferably a symbol that will enable a downstream positioned inspector to confirm the classification of the lumber piece set by the scanning device.

With this arrangement control of the production speed can be maintained without diminishing the production rate of the mill.

DETAILED DESCRIPTION OF THE INVENTION

Figure 1:
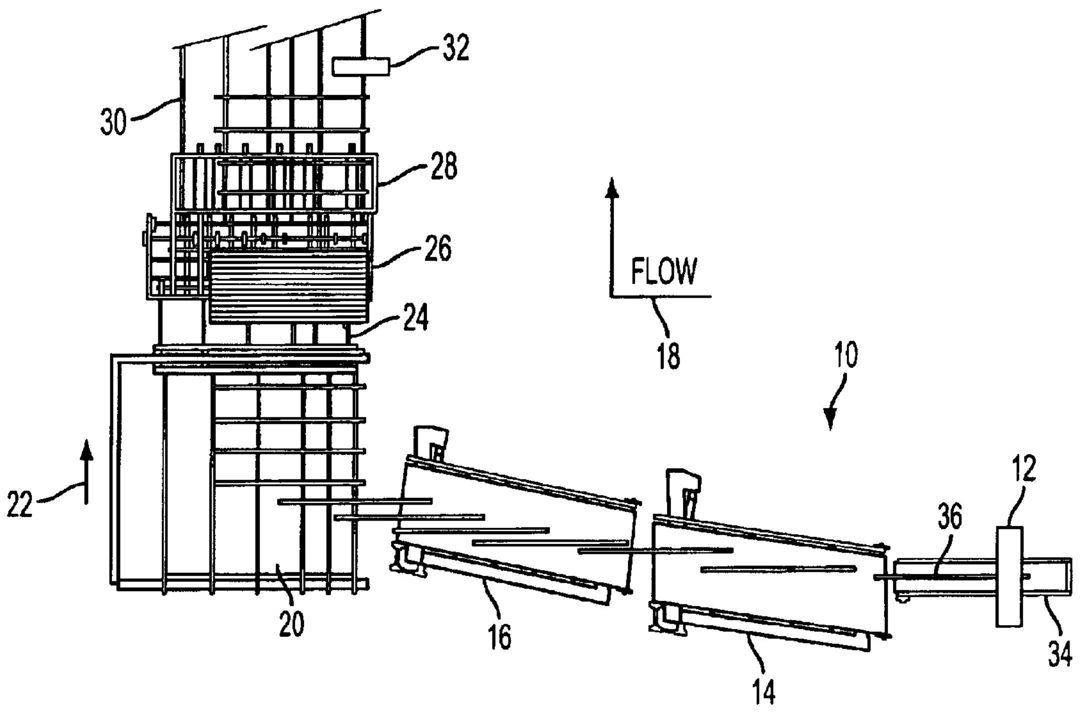
FIG. 1 is a top plan view of a conveying set up from a scanning position to an output position.
Figure 2:
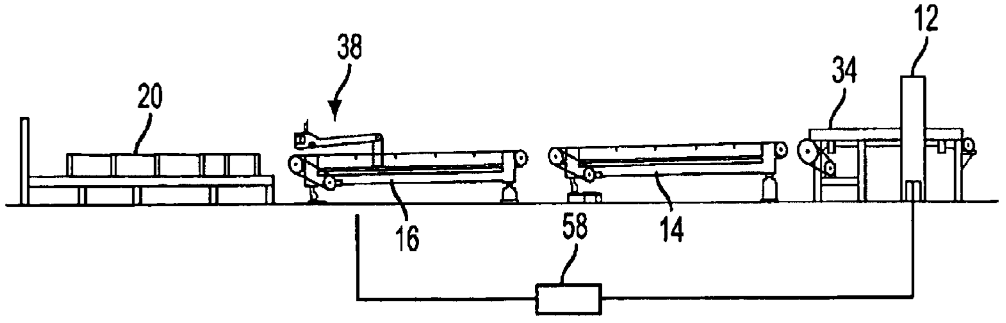
FIG. 2 is a side view in elevation of the set up of FIG. 1.
Figure 3:
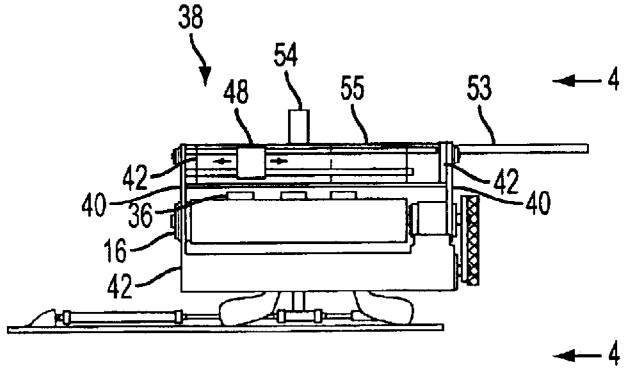
FIG. 3 is an end view taken along lines 3—3 of FIG. 2.
Figure 4:
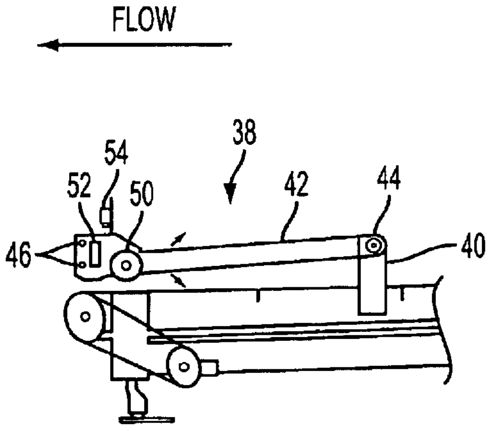
FIG. 4 is a detail view taken along lines 4—4 of FIG. 3.

Referring to the drawings where like numerals designate corresponding parts throughout the several views, there is shown in FIG. 1 a conveying arrangement 10 which includes a manning station 12, a first slow down conveyor 14 downstream of the station 12 and a second slow down conveyor 16 downstream of the first conveyor 12. The flow of pieces of lumber through the arrangement is indicated by the arrow 18 in the figures. Downstream of the conveyor 16 is lateral conveyor 20 which moves in the direction of arrow 22 to an inspection station 24 from which the boards are passed to feeder 26 which spaces the boards out on conveyor 30 to allow reading by a reader 32 of the printed material placed at station 16 as described below.

The scanner 12 includes a high speed belt conveyor 34 which will receive a piece of lumber 36 typically from a planer machine upstream of arrangement 10 and rapidly move the piece 36 under a defect scanner 12. One example of such a scanning operation involves the use of a laser and photocells with the laser used to illuminate the board and the photocells measuring the reflected light. Dark spots indicate the presence of a knot or other defect which warrants separation of the piece so marked from blemish free pieces of lumber. Other defects may also be detected depending on the type of lumber being handled and the market for which the lumber is intended. The use of several different types of defect scanners is also feasible and the subsequent scanners may be located adjacent the scanner 12 around the conveyor 34. Since these types of scanners operate at high speeds, such as on the order 2000 ft/minute for board throughput, and the downstream printers presently available operate at much slower speeds, one or more slow down conveyors 14 and 16 which are typically used in mills such as where the production line turns though an angle, are used in combination with the printing operation. Typically, the printing equipment can operate on a piece of lumber moving at about 1000 ft/minute. To achieve this magnitude of reduced speed, the conveyors 14 and 16 which are usually belt conveyors as shown receive the piece of lumber at an angle to the direction of transport from the exit end of conveyor 34. The width of each conveyor 14, 16 determines the number of pieces of lumber that can be accommodated as each piece is moved toward the printing station 38.

Since the slow down conveyors, to be effective, must spread out the pieces of lumber 36 laterally while still effecting longitudinal movement as shown on conveyors 14 and 16, the present invention provides at the printing station 38 an adjustment capability for a printing head. In one form, a pair of support arms 40 is attached to the conveyor chassis. In an alternate form, the arms 40 may be mounted on the floor. At its upper end, the arms 40 pivotally support a pair of booms shown at 42 for adjustment about a horizontal axis 44. At its free end, the booms 42 support a pair of vertically spaced guide rods 46 on which is slidably mounted a for a printing head 48. In operation, the printing head 48 is preferably an ink jet printer and is therefore spaced a small distance from the surface to be printed and the thickness of the boards will thus determine the position of the booms above the conveyor. Once the booms are positioned for a run, further adjustment is unnecessary. Also carried on the free end of the booms is a hydraulic or air piston and cylinder 53 for positioning the printing head in operation as described below. It is preferred that upstream of the printing head 48, a roller 50 be positioned to engage the upper surfaces of any bowed or twisted boards as they travel underneath the printing head 48 in order to flatten and stabilize the individual boards to improve the printing quality. To accommodate irregular boards and to avoid damage to the printer head, the booms may be capable of upward pivoting about axis 44 if an object impacts the roller 50 and the booms 42 under their own weight will then return to the selected position above the conveyor 16 after such an impact.

A support platform or rod 55 extends between the ends of the booms 42 and on the upper side 52 of the platform 55 is supported a board position sensor such as a photocell. The photocell output will be sent to a computer such as at 58 which will then control the actuation of the piston and cylinder 53 to position the printing head directly over a plow of lumber 36 moving on conveyer 16 and then actuate the printing head to print a symbol on a piece of lumber. After printing one board, the computer will then move the printing head 48 laterally by actuation of the piston and cylinder 53 over an adjacent piece of lumber and print the appropriate indicia thereon. By way of example, in a mill operation, it is preferable to print a symbol as noted above that is representative of the quality or other characteristic of the piece of lumber as determined by the upstream defect scanner 12 the output of which is also fed to the computer and stored there at least until the inspected place of lumber is adjacent the printing head 48. By appropriate software control, the scanned information symbol will be marked on the correct piece of lumber since the sequence of movement and timing will not vary between the scanner 12 and printing position 38 under normal operating conditions.

From the printing position 38, each piece will be pad to the landing table 20 where movement is shifted laterally in the direction of arrow 22 to a manual inspection position 24. As is the practice, a worker may make sure each piece is graded properly and marked by the printer before the piece is passed to the board feeder 28 and symbol reader 32 after which sorting takes place and any subsequent milling operation.

As will be apparent to those skilled in this field, various modifications to the foregoing process and apparatus are possible and it will be understood that such modifications are within the scope of this invention.

What is claimed is:

1. A method of operation to enable a mill to be operated at a selected production capacity while taking advantage of increased grading accuracy speeds afforded by presently available defect scanning devices comprising the steps of:

a) feeding individual workpieces to a first conveyor operating at a predetermined speed and which includes an inspection device;

b) inspecting the individual workpieces sequentially as each workpiece is passed adjacent to the inspection device;

c) passing the inspected workpiece to a second, slow down conveyor which moves the workpiece at a speed lower than said predetermined speed;

d) printing indicia on the workpiece at a printing station including a printer located adjacent said second, slow down conveyor while the workpiece is moving at the lower speed;

the method further including the step of using a belt conveyor as the second conveyor with the belt conveyor moving in a predetermined direction and including the step of positioning the predetermined direction of movement of the belt conveyor at a selected angle to the direction the first conveyor delivers a workpiece to the second conveyor, wherein the printer is mounted on a traversing conveyor so that the printer is movable transverse to said predetermined direction and including the step of supplying a plurality of individual workpieces to said second conveyor and printing data on the workpieces on the second conveyor.

2. The method as claimed in claim 1 wherein in the method includes the step of passing data from the inspection device to the printer.

3. A mounting arrangement for a symbol printer to improve the flexibility of the printing operation relative to conveying apparatus for workpieces, said arrangement comprising:

a first conveyor including an inspection device for inspecting workpieces carried on said first conveyorr, said first conveyor being disposed to pass workpieces at a selected speed in a first direction to a downstream, second conveyor, said second conveyor having a workpiece transport device moving in a second direction different from said first direction and at a speed slower than the selected speed of said first conveyor;

an indicia printing device associated with said second conveyor and positioned to print indicia on a workpiece moving on said second conveyor at said slower speed, said indicia printing device being connected to said inspection device with said inspection device controlling the indicia printed by said indicia printing device, wherein said indicia printing device is mounted on an arm that extends transversely over said second conveyor, and wherein said arm is mounted on a lever arm having one end pivotally mounted on a post allowing pivotal motion of said indicia printing device toward and away from said second conveyor.

4. The invention as claimed in claim 3 wherein said arm carries a roller positioned to engage workpieces on said second conveyor in advance of any printing of indicia by said indicia printing device.

5. The invention as claimed in claim 3 wherein said arm movably supports said indicia printing device and a drive device is provided to move said indicia printing device transversely over said second conveyor.

6. The invention as claimed in claim 5 wherein a computer is provided to receive data from said inspection device and to control actuation of said drive device to position said indicia printing device over a selected workpiece for printing as the workpiece moves adjacent to said indicia printing device.

7. The invention as claimed in claim 6 wherein said drive device is a piston and cylinder.

8. The invention as claimed in claim 5 wherein said drive device is a piston and cylinder.

* * * * *